United States Patent
Lin et al.

(10) Patent No.: US 10,684,657 B2
(45) Date of Patent: Jun. 16, 2020

(54) MULTI-AXIS HINGE AND ELECTRONIC DEVICE WITH THE SAME

(71) Applicant: ASUSTeK COMPUTER INC., Taipei (TW)

(72) Inventors: Yu-Kang Lin, Taipei (TW); Yu-Min Liu, Taipei (TW); Yen-Chung Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/892,470

(22) Filed: Feb. 9, 2018

(65) Prior Publication Data

US 2018/0239401 A1 Aug. 23, 2018

(30) Foreign Application Priority Data

Feb. 18, 2017 (TW) .............................. 106105481 A

(51) Int. Cl.
*F16C 11/10* (2006.01)
*E05D 3/18* (2006.01)
(Continued)

(52) U.S. Cl.
CPC ............. *G06F 1/1681* (2013.01); *E05D 3/18* (2013.01); *E05D 7/009* (2013.01); *E05D 11/06* (2013.01);
(Continued)

(58) Field of Classification Search
CPC ..... G06F 1/1681; G06F 1/1654; E05D 11/06; E05D 11/087; E05D 7/009; E05D 3/18; F16C 11/103; E05Y 2900/606
See application file for complete search history.

(56) References Cited

U.S. PATENT DOCUMENTS 8,776,319 B1 * 7/2014 Chang .................. G06F 1/1681
16/303
2014/0196254 A1 * 7/2014 Song ........................ E05D 3/14
16/302

(Continued)

FOREIGN PATENT DOCUMENTS

| CN | 204553530 U | 8/2015 |
| CN | 204784144 U | 11/2015 |
| WO | 2016085697 A1 | 6/2016 |

*Primary Examiner* — Jinhee J Lee
*Assistant Examiner* — Theron S Milliser
(74) *Attorney, Agent, or Firm* — McClure, Qualey & Rodack, LLP

(57) ABSTRACT

A multi-axis hinge includes a first shaft, a first rotary member pivotally connected to the first shaft, a second shaft fixed to the first rotary member, a second rotary member pivotally connected to the second shaft, a first switching pin movably configured at the first rotary member, and a switching member fixed to the first shaft. The switching member includes a switching recess. When the first switching pin is located at the switching recess of the switching member, the second rotary member is rotatable relatively to the first rotary member. The second rotary member includes a switching recess. When the first switching pin is located at the switching recess of the second rotary member, the second rotary member is fixed to the first rotary member. An electronic device with the multi-axis hinge is also disclosed therein.

9 Claims, 10 Drawing Sheets

(51) Int. Cl.

| | |
|---|---|
| *E05D 7/00* | (2006.01) |
| *E05D 11/08* | (2006.01) |
| *E05D 11/06* | (2006.01) |
| *F16M 11/10* | (2006.01) |
| *F16C 11/04* | (2006.01) |
| *G06F 1/16* | (2006.01) |

(52) U.S. Cl.
CPC .......... *E05D 11/087* (2013.01); *F16C 11/103* (2013.01); *F16M 11/10* (2013.01); *G06F 1/1616* (2013.01); *G06F 1/1654* (2013.01); *E05Y 2900/606* (2013.01); *F16C 11/04* (2013.01)

(56) References Cited

U.S. PATENT DOCUMENTS

| | | | |
|---|---|---|---|
| 2015/0009614 A1* | 1/2015 | Tsai | G06F 1/1681 361/679.27 |
| 2015/0092331 A1* | 4/2015 | Kinoshita | G06F 1/1681 361/679.09 |
| 2015/0227175 A1* | 8/2015 | Motosugi | G06F 1/1681 16/341 |
| 2015/0361696 A1* | 12/2015 | Tazbaz | H04M 1/022 361/679.27 |
| 2015/0362956 A1* | 12/2015 | Tazbaz | G06F 1/1637 361/679.27 |
| 2016/0132075 A1* | 5/2016 | Tazbaz | G06F 1/1681 361/679.27 |
| 2016/0132076 A1* | 5/2016 | Bitz | G06F 1/1681 361/679.27 |
| 2016/0147267 A1* | 5/2016 | Campbell | G06F 1/1681 361/679.27 |
| 2016/0161993 A1* | 6/2016 | Zhang | G06F 1/1681 361/679.09 |
| 2016/0215541 A1* | 7/2016 | Tazbaz | E05D 3/14 |
| 2016/0224072 A1* | 8/2016 | Huang | E05D 7/06 |
| 2016/0266615 A1* | 9/2016 | Uchiyama | G06F 1/1681 |
| 2016/0357226 A1 | 12/2016 | Campbell et al. | |
| 2017/0090523 A1* | 3/2017 | Tazbaz | G06F 1/1681 |

\* cited by examiner

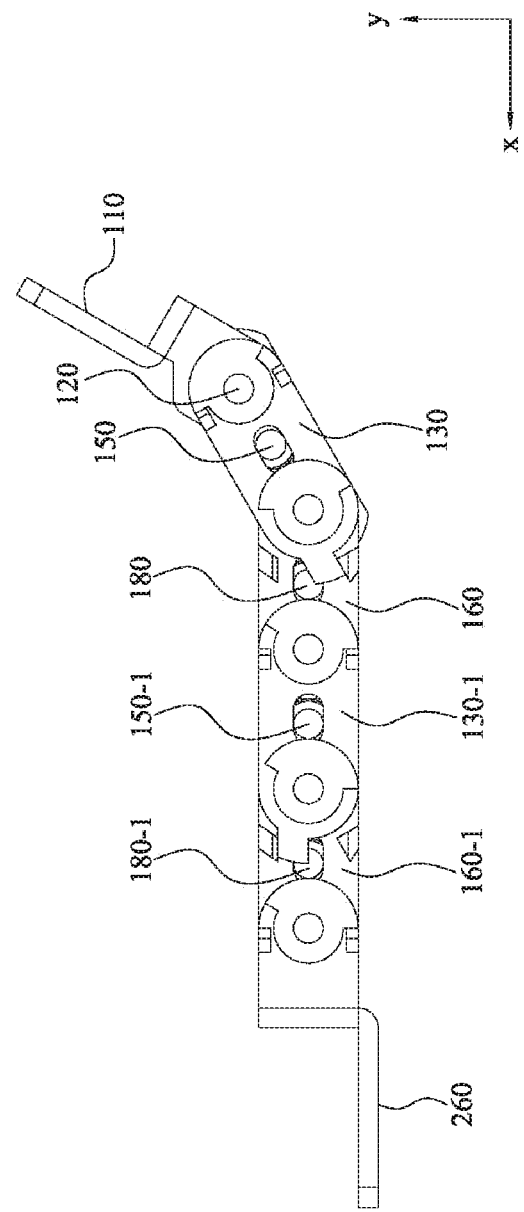

MULTI-AXIS HINGE AND ELECTRONIC DEVICE WITH THE SAME

CROSS-REFERENCE TO RELATED APPLICATIONS

The present Application claims the benefit of TW Application Serial No. 106105481 filed on Feb. 18, 2017. The entirety of the above-mentioned patent application is hereby incorporated by reference herein and made a part of specification.

BACKGROUND OF THE INVENTION

Field of the Invention

The disclosure relates to a multi-axis hinge and, more particularly, to a multi-axis hinge of an electronic device.

Description of the Related Art

Electronic devices provide various standing states for users to facilitate operating or watching purpose nowadays. A support frame is usually installed at a back of the portable electronic devices, such as a tablet computer, for users to operate the tablet in a stable position on the desk easily.

Some conventional support frames, such as a protection cover, also provide as a supporter for a tablet. However, folding the protection cover in various way to facilitate operating or watching purpose would damage the protection cover easily, and the appearance of the tablet computer is also affected.

BRIEF SUMMARY OF THE INVENTION

According to an aspect of the disclosure, a multi-axis hinge is disclosed. Multi-axis hinge comprises: a first shaft; a first rotary member, pivotally connected to the first shaft; a second shaft, fixed to the first rotary member; a second rotary member, pivotally connected to the second shaft; a first switching pin, movably configured at the first rotary member; and a switching member fixed to the first shaft and including a switching recess, wherein when the first switching pin is located at the switching recess of the switching member, the second rotary member is rotatable relatively to the first rotary member.

According to another aspect of the disclosure, an electronic device with multi-axis hinge is disclosed. The electronic device comprises: a display screen; a support frame; and a multi-axis hinge including: a first shaft; a first rotary member, pivotally connected to the first shaft; a second shaft, fixed to the first rotary member; a second rotary member, pivotally connected to second shaft; a first switching pin, movably configured at the first rotary member; a switching member fixed to the first shaft and including a switching recess, wherein when the first switching pin is located at the switching recess of the switching member, the second rotary member is rotatable relatively to the first rotary member; a first fixing member, fixed to the first shaft and fixed on the display screen; and a second fixing member, fixed to a side of the second shaft in series, and fixed at the support frame.

In conclusion, according to the multi-axis rotary hinge in embodiments, multiple shafts and multiple rotating members and multiple switching members are connected to the first fixing member and the second fixing member. Then, the length of the multi-axis hinge is extended. Moreover, the number of shafts of the multi-axis hinge is increased. The rotating angle of each rotating shaft is improved. Furthermore, the appearance about the bending of the protection plate is beautified. The service life of the protection plate and the electronic device is extended.

BRIEF DESCRIPTION OF THE DRAWINGS

FIGS. 5A-5F are schematic diagrams showing continuous operations of the multi-axis hinge shown in FIG. 2 in usage.

DETAILED DESCRIPTION OF THE EMBODIMENTS

These and other features, aspects, and advantages of the present invention will become better understood with regard to the following description, appended claims, and accompanying drawings. However, the invention is not limited to the embodiments. The description of the operation of components is not used for limiting the execution sequence. Any equivalent device with the combination according to the disclosure of the invention is in the scope of the invention. The components shown in figures are not used for limit the size or the proportion. The same or similar number denotes the same or similar components.

Unless otherwise defined, all terms have the meaning as commonly understood for people skilled in the art, the meaning commonly used in dictionaries, or the meaning consistent with the content of the related art.

Terms "first", "second" and so on are not used to limit the order or the sequence, but used to distinguish components or operations of same terms.

Terms "includes", "comprise" and so on are open-ended.

Figure 1:
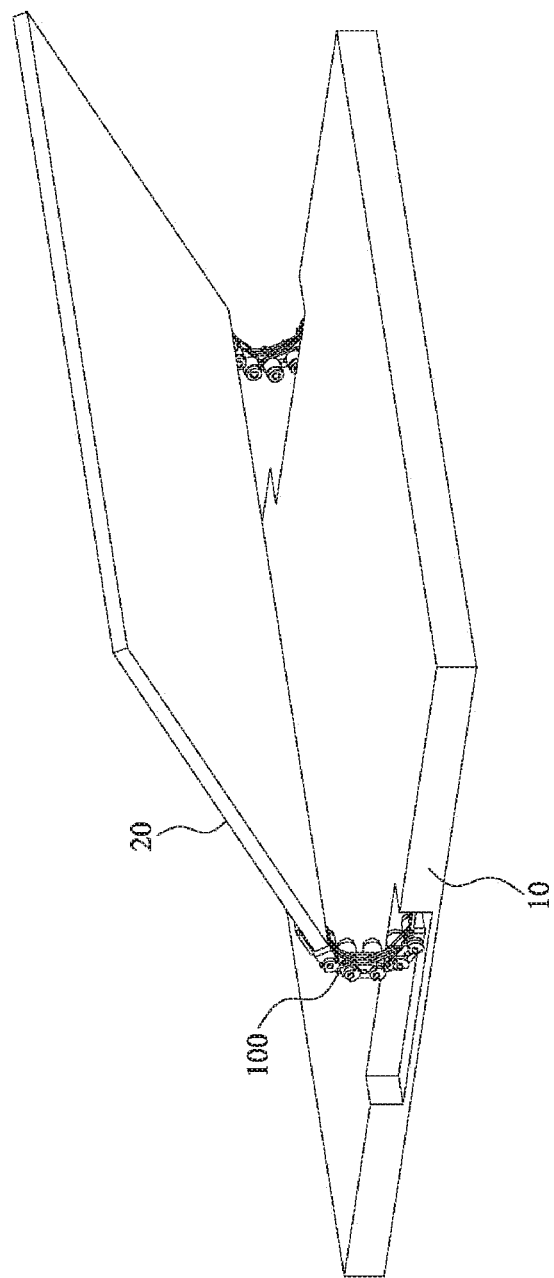
FIG. 1 is a three-dimensional schematic diagram of a multi-axis hinge applied to an electronic device according to an embodiment.
Figure 2:
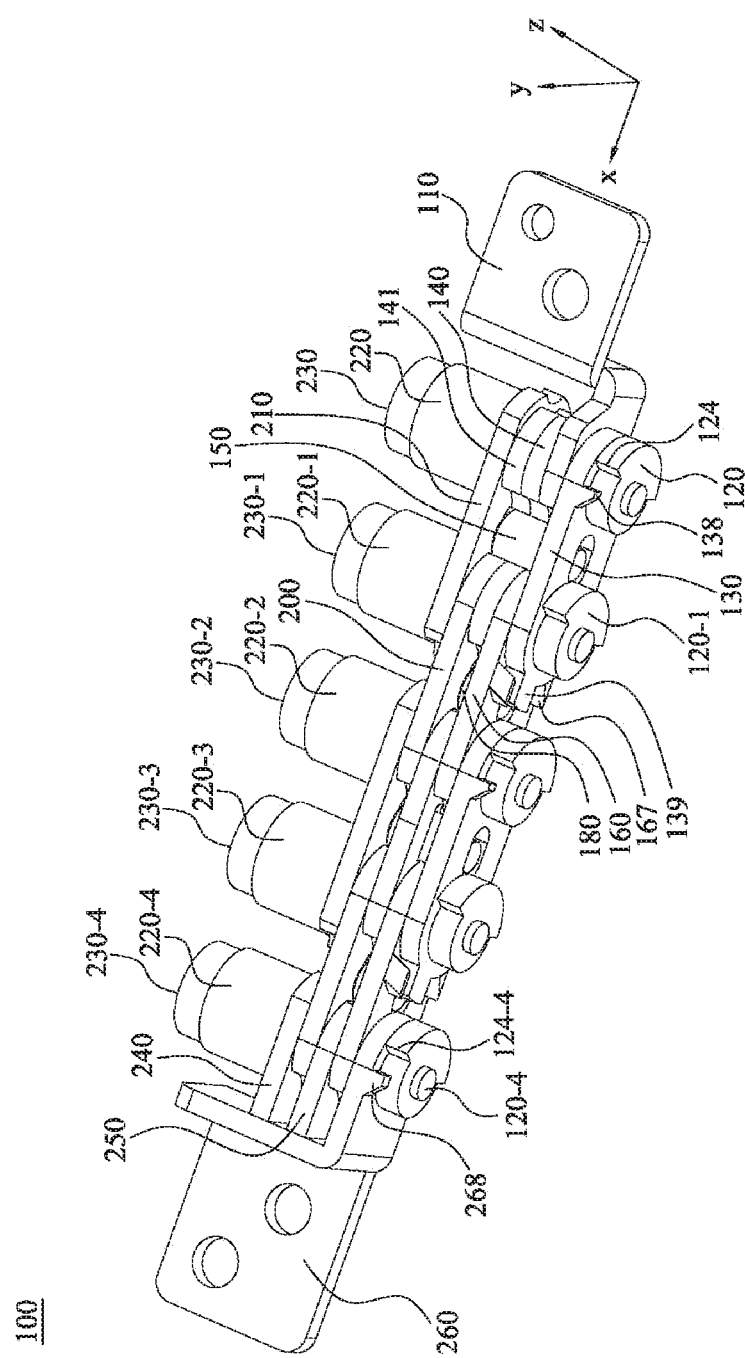
FIG. 2 is a three-dimensional schematic diagram of a multi-axis hinge according to an embodiment.
Figure 3:
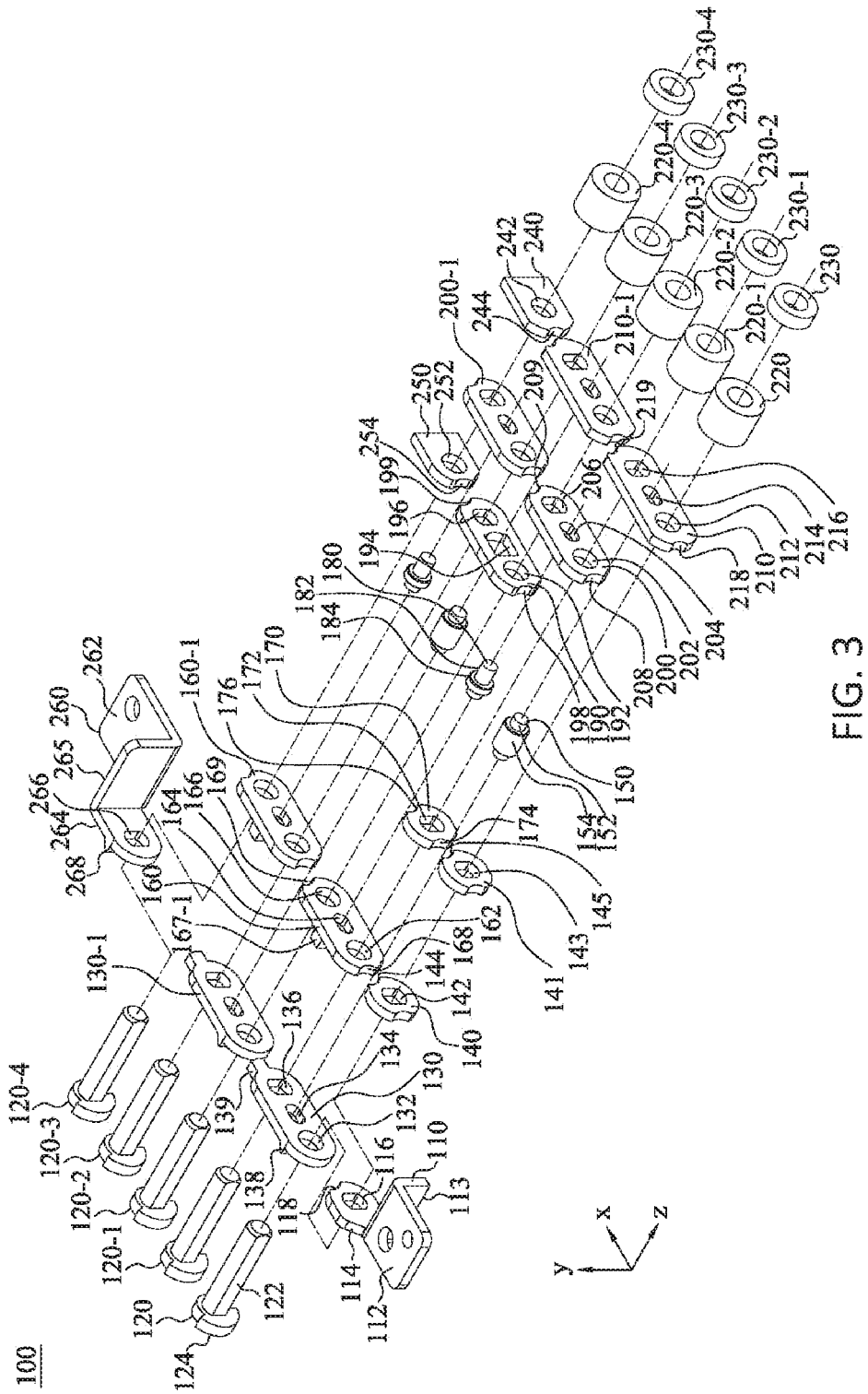
FIG. 3 is an exploded diagram of the multi-axis hinge shown in FIG. 2.
Figure 4:
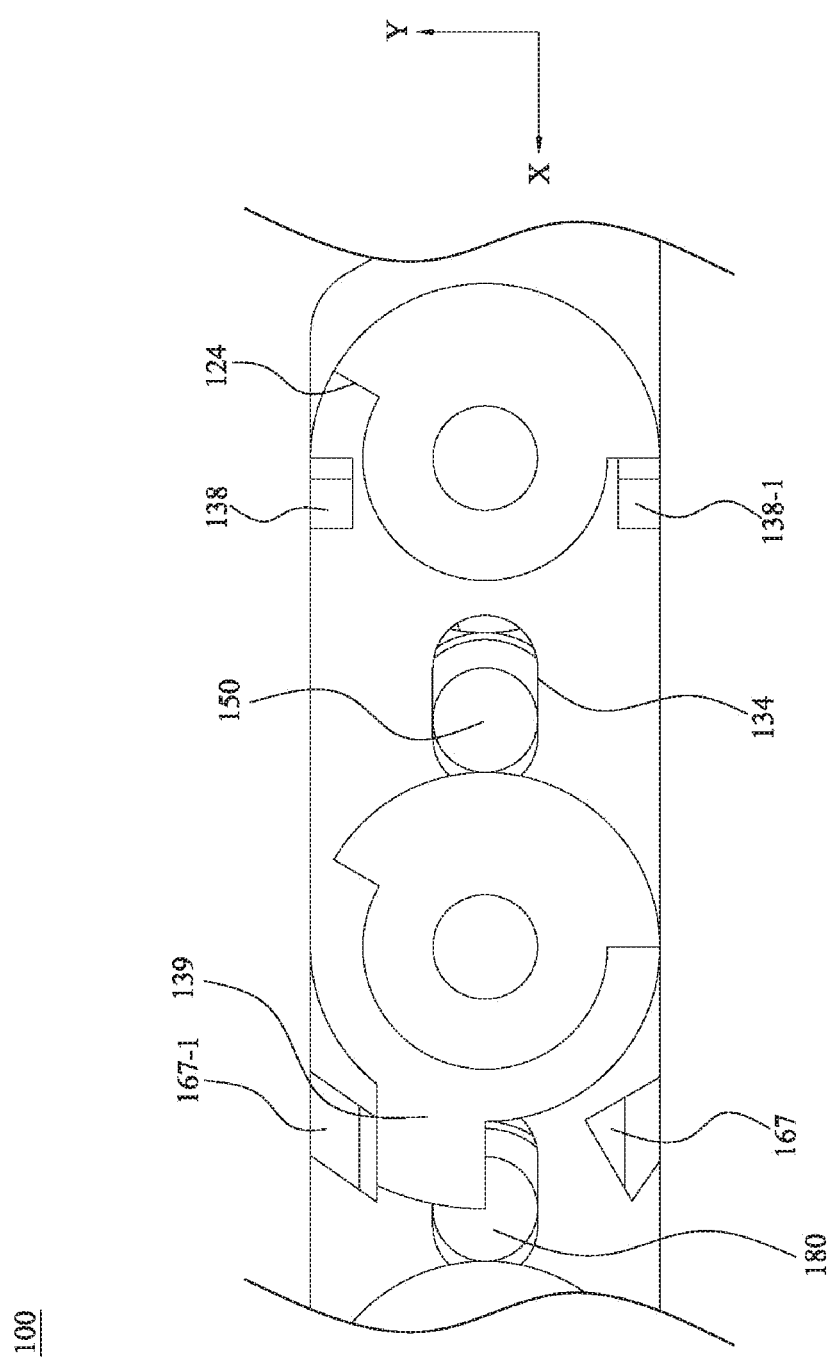
FIG. 4 is a partial enlarged diagram of the multi-axis hinge shown in FIG. 2.

FIG. 1 is a three-dimensional schematic diagram of a multi-axis hinge applied to an electronic device according to an embodiment. FIG. 2 is a three-dimensional schematic diagram of a multi-axis hinge according to an embodiment. FIG. 3 is an exploded diagram of the multi-axis hinge shown in FIG. 2. FIG. 4 is a partial enlarged diagram of the multi-axis hinge shown in FIG. 2. FIGS. 5A-5F are schematic diagrams showing continuous operations of the multi-axis hinge shown in FIG. 2 in usage. The X, Y, Z coordinates in figures are used for explaining the rotation and movement of components when the multi-axis hinge is rotated, but not used to limited a rotation range of the multi-axis rotating shaft. The X-axis represents the extension direction from the first fixing member 110 to the second fixing member 260. The Z axis represents the direction parallel to the shaft. An angle limiting flange portion 124 of the first shaft 120 extends to the direction of the non-circular rotating portion 122. The Y-axis represents the direction of the fixing sheet 112 perpendicular to the first fixing member 110.

Please refer to FIG. 1 and FIG. 2. A first fixing member 110 is configured at an end of the multi-axis hinge 100, and a second fixing member 260 is configured at another end. In an embodiment, the first fixing member 110 is used to fix the first portion of the electronic device, such as a display screen 10. The second fixing member 260 is used to fix the second portion of the electronic device, such as a support frame 20, to support the display screen on the desktop.

As shown in FIG. 3. The first fixing member 110 includes a fixing sheet 112, an extending sheet 113, a connecting sheet 114, and a fixing hole 116 disposed in the connecting sheet 114. The fixing sheet 112 is configured to be connected to the first portion of the electronic device. In the embodiment, the fixing hole 116 is a noncircular hole.

The first shaft 120 penetrates through the fixing hole 116 of the first fixing member 110. The first shaft 120 includes a non-circular rotating portion 122. The non-circular rotating portion 122 of the first shaft 120 is contacted to the fixing hole 116 of the first fixing member 110. Then, the first shaft 120 and the first fixing member 110 have a same rotational direction and a same angle.

A first rotary member 130 is pivotally connected to the first shaft 120. In an embodiment, the first rotary member 130 includes a movable hole 132, a switching hole 134, a fixing hole 136, an angle positioning portion 138, and an angle limiting protrusion portion 139. The first shaft 120 penetrates through the movable hole 132 of the first rotary member 130, and then the first rotary member 130 is pivotally connected to the first shaft 120.

Figure 5A:
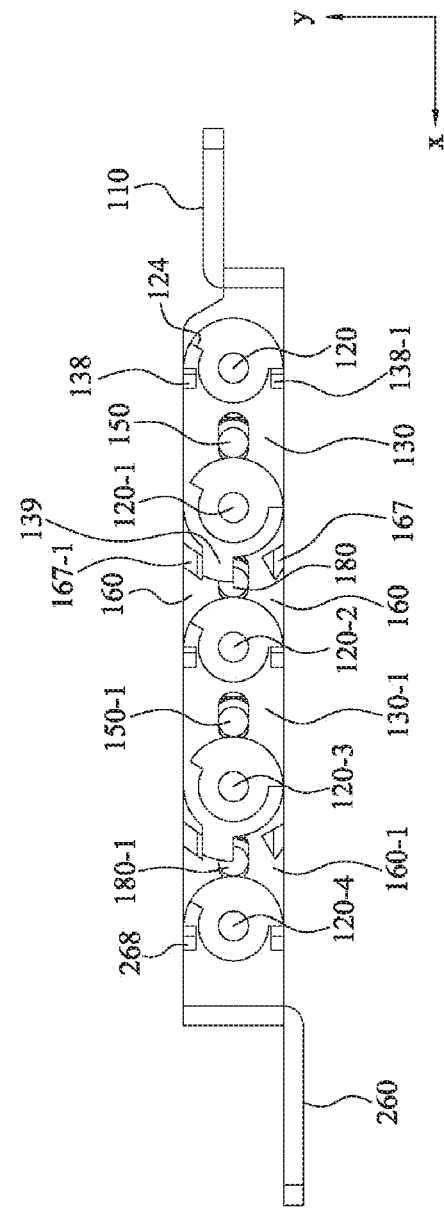
Figure 5B:
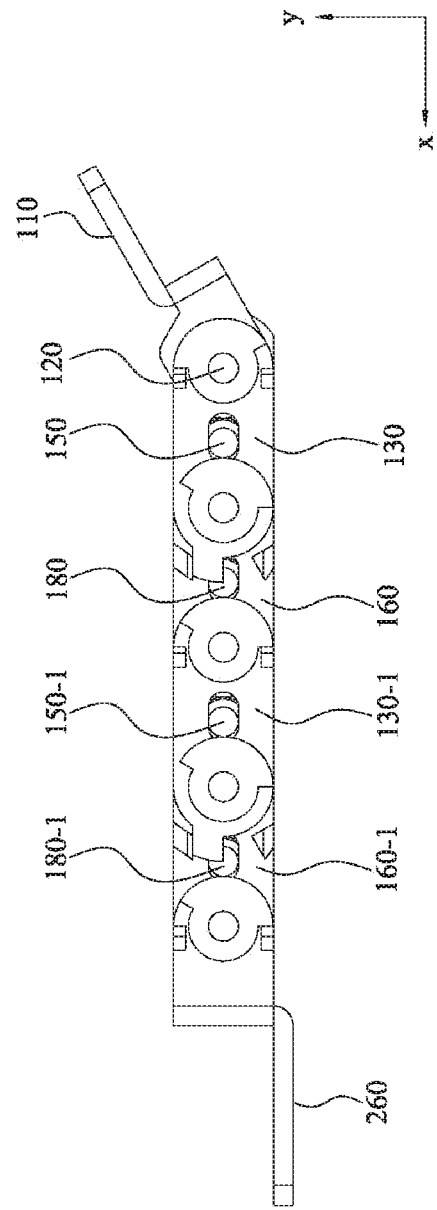
Figure 5D:
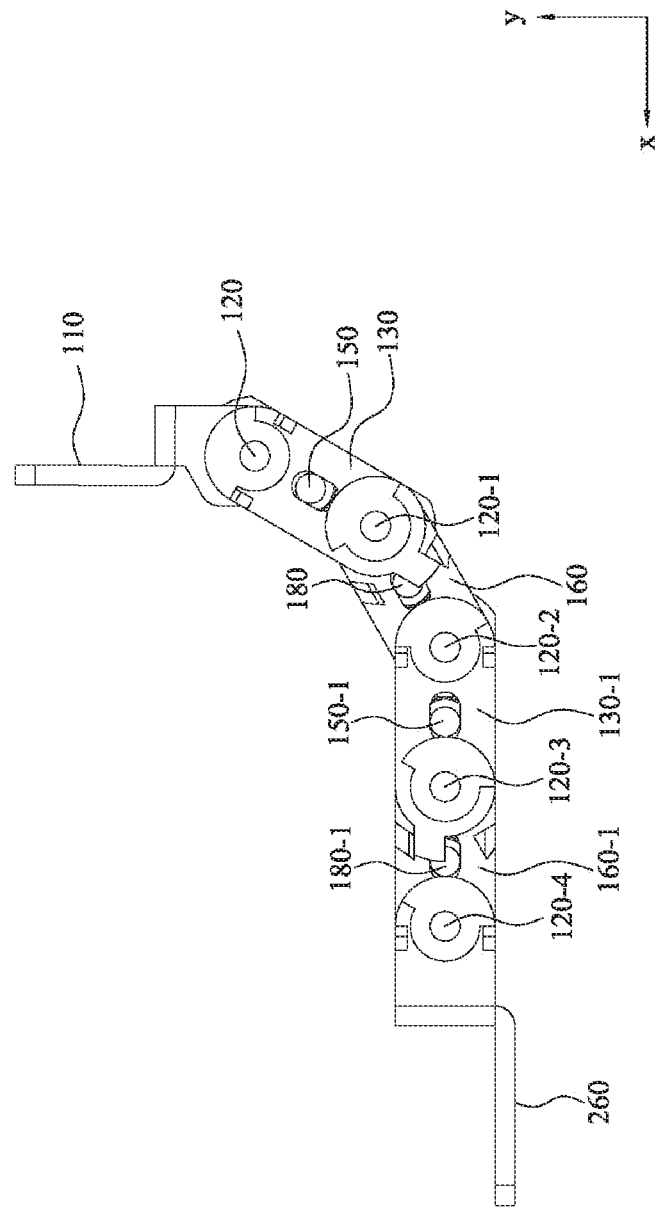
Figure 5E:
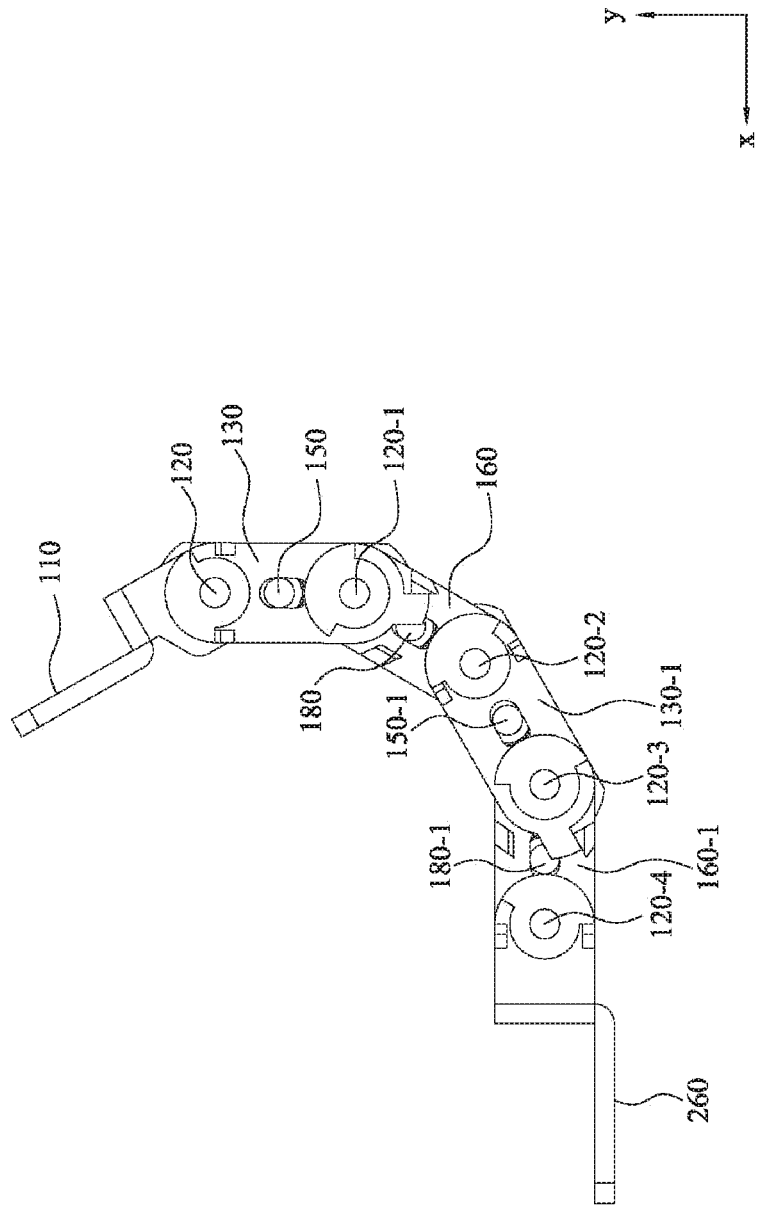
Figure 5F:
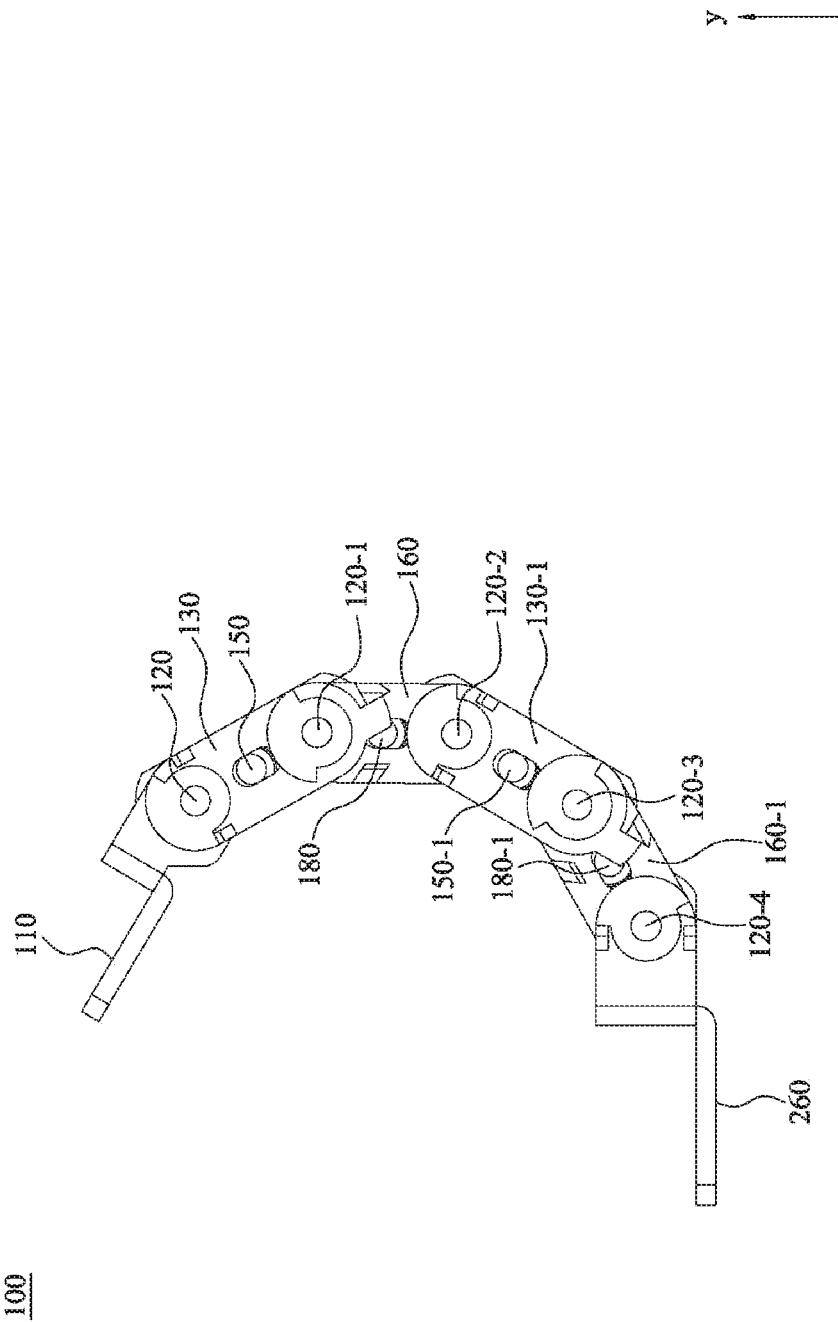

Please refer to FIG. 3 and FIG. 5A-5B. When the first fixing member 110 rotates on the XY plane, the first shaft 120 rotates together with the first fixing member 110 until the angle limiting flange portion 124 of the first shaft 120 contacts the angle positioning portion 138 of the first rotary member 130. In an embodiment, the angle formed by the angle positioning portion 138, 138-1 of the first rotary member 130 and the angle limiting flange portion 124 is about 20 degrees to 45 degrees, preferably about 30 degrees, which is not limited herein. Therefore, the angle that the first fixing member 110 rotates relatively to the first rotary member 130 is about 20 degrees to 45 degrees, preferably about 30 degrees, which is not limited herein.

The first shaft 120 is fixed to a switching member 140. The switching member 140 includes a fixing hole 142 and a switching recess 144. The fixing hole 142 is a non-circular opening hole fixed on the first shaft 120. The switching recess 144 is formed on a periphery of the switching member 140. The first switching pin 150 is configured in the switching hole 134 of the first rotary member 130 and horizontally moves along the direction of X axis in FIG. 3.

In an embodiment, when the multi-axis hinge 100 is at the state shown in FIG. 5A, the first switching pin 150 locates at the left side of the switching hole 134 (please refer to a partial enlarged diagram in FIG. 4). When the first fixing member 110 rotates upwards, as shown in FIG. 5B, that is, the first fixing member 110 rotates along a counter-clockwise direction, the switching member 140 rotates together with the first fixing member 110 and the first shaft 120 until the angle limiting flange portion 124 of the first shaft 120 contacts the angle positioning portion 138 of the first rotary member 130. At the time, the switching recess 144 of the switching member 140 is aligned to the first switching pin 150. Therefore, the first switching pin 150 moves to the right side of the switching hole 134 of the first rotary member 130, that is, moves to −X direction in FIG. 4.

A second rotary member 160 is pivotally connected to second shaft 120-1. The second rotary member 160 includes a movable hole 162, a switching hole 164, a movable hole 166 (the movable hole 166 is a fixing hole in an embodiment), a switching recess 168, a switching recess 169, an angle limiting portion 167, and an angle limiting portion 167-1. As the state shown in FIG. 5A, the first switching pin 150 is disposed in the switching recess 168 of the second rotary member 160. Therefore, the second rotary member 160 is fixed on the first rotary member 130 and cannot rotate relative to the first rotary member 130.

When the first fixing member 110 rotates to a preset angle as shown in FIG. 5B, the switching recess 118 of the first fixing member 110 is aligned to the first switching pin 150. At the time, the switching recess 144 of the switching member 140 is aligned to the first switching pin 150. Therefore, the first switching pin 150 is movable towards to an −X direction. Then, as shown FIG. 5C, since the angle limiting flange portion 124 of the first shaft 120 contacts the angle positioning portion 138 of the first rotary member 130, the first fixing member 110 cannot continue to rotate relatively to the first rotary member 130. When the first fixing member 110 further rotates, the first switching pin 150 is pushed out via the switching recess 168 of the second rotary member 160. The first switching pin 150 moves to the switching recess 118 of the first fixing member 110 and also moves to the switching recess 144 of the switching member 140. As a result, the second rotary member 160 is rotatable relatively to the first rotary member 130. The multi-axis hinge 100 further rotates to the preset angle until the angle limiting protrusion portion 139 of the first rotary member 130 contacts the angle limiting portion 167 of the second rotary member 160. As mentioned above, the preset angle is about 20 degrees to 45 degrees, perfectly 30 degrees, which is not limited herein.

Please refer to FIG. 3. The second shaft 120-1 is fixed to a switching member 170. The switching member 170 further includes a fixing hole 172, a switching recess 174 and a switching recess 176. The fixing hole 172 is fixed to the second shaft 120-1. A second switching pin 180 is disposed in the switching hole 164 of the second rotary member 160. The second switching pin 180 is movable in the switching hole 164. Similar to the way as mentioned above, when the angle limiting protrusion portion 139 of the first rotary member 130 contacts the angle limiting portion 167 of the second rotary member 160, the first rotary member 130 cannot continue to move relative to the second rotary member 160. At the time, the switching recess 176 of the switching member 170 is aligned to the second switching pin 180. Thus, the second switching pin 180 moves to the right side of the switching hole 164. As a result, when a next rotary member, such as the first rotary member 130-1 in FIG. 5, is released, the second rotary member 160 is rotatable relatively to the first rotary member 130-1.

According to the multi-axis hinge 100 in embodiments, with the combination of a plurality of first shafts, second shafts, first rotary members, second rotary members, switching pins and switching members, the length of the multi-axis hinge 100 is extended. Moreover, the number of rotating shafts of the multi-axis hinge 100 is increased. The rotating angle of each rotating shaft is reduced. Furthermore, the appearance about the bending of the protection plate is improved. The service life of the protection plate and the electronic device is extended.

The third rotary member 210 and the fourth rotary member 200 are configured at the first shaft 120 and the second shaft 120-1, which correspond to the second rotary member 160 and the first rotary member 130, respectively. Then, the stress on the shafts is balanced, which is not limited herein. In an embodiment, the rotary member is configured at one side of the shafts. In an embodiment, multiple groups of rotary members are configured at the shafts along the direction of the Z axis to increase the strength, which is not limited herein.

Please refer to FIG. 3. In an embodiment, the third rotary member 210 includes a movable hole 212, a switching hole 214, a fixing hole 216, a switching recess 218 and a switching recess 219. The fourth rotary member 200 includes a movable hole 202, a switching hole 204, a fixing hole 206, a switching recess 208 and a switching recess 209.

In an embodiment, in order to install conveniently, part of fixing holes is changed to be movable holes. The fixing holes needs to be configured at a same axis center to facilitate the synchronous rotation of the shafts, rotary members and switching members. For example, the movable hole 166 of the second rotary member 160 is a fixing hole (a movable hole in another embodiment), the fixing hole 206 of the fourth rotary member 200 is a movable hole (a fixing hole in the another embodiment) correspondingly, which does not depart from the spirit and scope of the invention.

Please refer to FIG. 3. In an embodiment, the multi-axis hinge 100 further includes a rotation switching member 190 configured between the second rotary member 160 and the fourth rotary member 200. As a result, the rotary member components are symmetrically configured at the direction of the X axis, and a subsequent switching pin is conveniently configured. The rotation switching member 190 includes a movable hole 192, a switching hole 194, a fixing hole 196, a switching recess 198 and a switching recess 199.

Please refer to FIG. 3. The first switching pin 150 includes a movable shaft 152 and a switching control flange 154. The second switching pin 180 includes a movable shaft 182 and a switching control flange 184, which is not limited herein. The size of the moving shaft and the size of the switching control flange is interchanged with each other. For example, the size of the moving shaft is larger than the switching control flange. The size of the switching recess of the corresponding rotating member should be matched the first switching pin correspondingly, which does not depart from the spirit and scope of the invention.

Some components with the same shape are manufactured separately or integrated. In an embodiment, the switching member 140, the switching member 141 and the connecting sheet 114 of the first fixing member 110 are integrally manufactured. In an embodiment, as shown in FIG. 3, the switching member 140, the switching member 141 and the connecting sheet 114 are manufactured separately as three components. Then, standardized components are easily manufactured. The switching member 141 includes a fixing hole 143 and a switching recess 145.

Please refer to FIG. 3. The third shaft 120-2 (another first shaft), the fourth shaft 120-3 (another second shaft), the fifth shaft 120-4 of the multi-axis hinge 100 are configured to be connected to another first rotary member 130-1, another second rotary member 160-1, another third rotary member 210-1 and another fourth rotary member 200-1 in series. Consequently, the number of the shaft is effectively increased, the rotary angle of each shaft is reduced, and the length of the shaft is extended.

In an embodiment, a fixed switching member 240 and a fixed switching member 250 are configured at the second fixing member 260 to rotate the fifth shaft 120-4 according to requirements. The second fixing member 260 includes a fixing sheet 262, an extending sheet 265, a connecting sheet 264, a fixing hole 266 and an angle fixing protrusion portion 268. The fixing sheet 262 is configured to be connected to the second part of the electronic device, such as a support frame. The angle fixing protrusion portion 268 is used to limit the rotation angle by contacting the angle limiting flange portion of the rotary member of the fifth shaft 120-4. The fixed switching member 240 includes a movable hole 242 and a switching recess 244. The fixed switching member 250 includes a movable hole 252 and a switching recess 254.

In an embodiment, elastic piece structures (such as elastic piece structures 220, 220-1, 220-2, 220-3, 220-4 in FIG. 3) and nuts (such as nuts 230, 230-1, 230-2, 230-3, 230-4 in FIG. 3) are configured at each shaft. Then, the friction force at the shaft is controlled, and the positioning capability of the shaft is improved. When the multi-axis hinge 100 restores from the state in FIG. 5F to the state in FIG. 5A, the multi-axis hinge 100 rotates reversely as the sequence stated above, to return to the original position.

In conclusion, according to the multi-axis rotary hinge in embodiments, multiple shafts and multiple rotating members and multiple switching members are connected to the first fixing member and the second fixing member. Then, the length of the multi-axis hinge 100 is extended. Moreover, the number of shafts of the multi-axis hinge 100 is increased. The rotating angle of each rotating shaft is reduced. Furthermore, the appearance about the bending of the protection plate is improved. The service life of the protection plate and the electronic device is extended.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A multi-axis hinge, comprising:
   a first shaft;
   a first rotary member, pivotally connected to the first shaft;
   a second shaft, fixed to the first rotary member;
   a second rotary member, pivotally connected to the second shaft;
   a first switching pin, movably configured at the first rotary member, wherein the first switching pin comprises a movable shaft and a switching control flange, and a diameter of the switching control flange of the first switching pin is larger than a diameter of the movable shaft of the first switching pin;
   a second switching pin, movably configured at the second rotary member, wherein the second switching pin comprises a movable shaft and a switching control flange, a diameter of the switching control flange of the second switching pin is larger than a diameter of the movable shaft of the second switching pin, and the switching control flange of the first switching pin is longer than the switching control flange of the second switching pin;
   a switching member fixed to the first shaft and including a first switching recess; and
   a rotation switching member including a third switching recess, wherein when the switching control flange of the first switching pin is located at the first switching recess of the switching member, the second rotary member is rotatable relatively to the first rotary member, wherein when the movable shaft of the second switching pin is located at the third switching recess of the rotation switching member, the second rotary member is fixed to the rotation switching member, wherein the first rotary member includes an angle limiting protrusion portion, the second rotary member includes two angle limiting portions, the angle limiting protrusion portion and the angle limiting portions are configured to control a rotation angle between the first rotary member and the second rotary member.

2. The multi-axis hinge according to claim 1, wherein the second rotary member includes a second switching recess, when the first switching pin is located at the second switching recess of the second rotary member, the second rotary member is fixed to the first rotary member.

3. The multi-axis hinge according to claim 2, wherein the multi-axis hinge further includes a first fixing member fixed to the first shaft, and a second fixing member fixed to a side of the second shaft.

4. The multi-axis hinge according to claim 3, wherein the first shaft includes an angle limiting flange portion, the first rotary member includes an angle positioning portion, and the angle limiting flange portion and the angle positioning portion are configured to control a rotation angle between the first fixing member and the first rotary member.

5. The multi-axis hinge according to claim 4, wherein the multi-axis hinge further includes a third rotary member and a fourth rotary member, the third rotary member is pivotally connected to the first shaft and fixed to the second shaft, and the fourth rotary member is pivotally connected to the second shaft.

6. The multi-axis hinge according to claim 5, wherein the multi-axis hinge further includes a fifth shaft pivotally connected to the second fixing member.

7. The multi-axis hinge according to claim 6, wherein the multi-axis hinge further includes a plurality of elastic piece structures configured at the first shaft, the second shaft and the fifth shaft, respectively.

8. An electronic device, comprising:
a display screen;
a support frame; and
a multi-axis hinge including:
 a first shaft;
 a first rotary member, pivotally connected to the first shaft;
 a second shaft, fixed to the first rotary member;
 a second rotary member, pivotally connected to second shaft;
 a first switching pin, movably configured at the first rotary member, wherein the first switching pin comprises a movable shaft and a switching control flange, and a diameter of the switching control flange of the first switching pin is larger than a diameter of the movable shaft of the first switching pin;
 a second switching pin, movably configured at the second rotary member, wherein the second switching pin comprises a movable shaft and a switching control flange, a diameter of the switching control flange of the second switching pin is larger than a diameter of the movable shaft of the second switching pin, and the switching control flange of the first switching pin is longer than the switching control flange of the second switching pin;
 a switching member fixed to the first shaft and including a switching recess;
 a rotation switching member including a third switching recess, wherein when the switching control flange of the first switching pin is located at the switching recess of the switching member, the second rotary member is rotatable relatively to the first rotary member, wherein when the movable shaft of the second switching pin is located at the third switching recess of the rotation switching member, the second rotary member is fixed to the rotation switching member;
 a first fixing member, fixed to the first shaft and fixed on the display screen; and
 a second fixing member, connected to a side of the second shaft in series, and fixed at the support frame, wherein the first rotary member includes an angle limiting protrusion portion, the second rotary member includes two angle limiting portions, the angle limiting protrusion portion and the angle limiting portions are configured to control a rotation angle between the first rotary member and the second rotary member.

9. The electronic device according to claim 8, wherein the multi-axis hinge further includes a plurality of elastic piece structures configured at the first shaft and the second shaft, respectively.

* * * * *